Feb. 13, 1962 J. G. SAGE 3,020,629
APPARATUS FOR CHANGING BEARING SLIPPERS IN ROLLING
MILL UNIVERSAL DRIVE ASSEMBLIES
Filed April 23, 1958 2 Sheets-Sheet 1
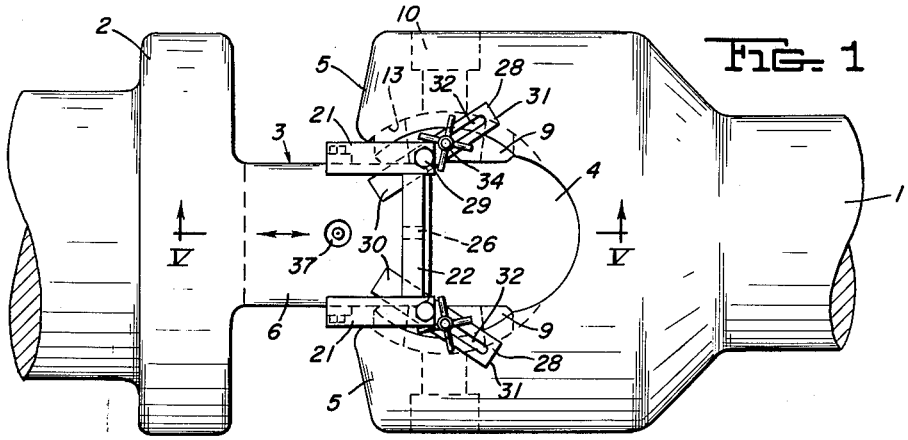
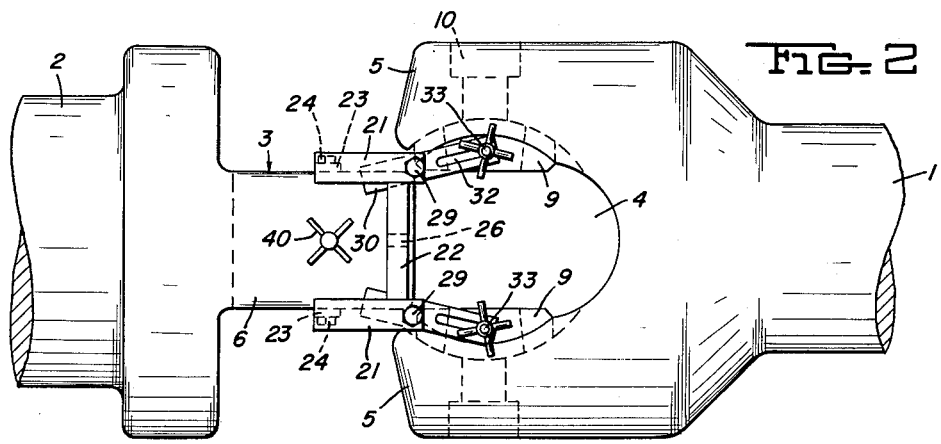
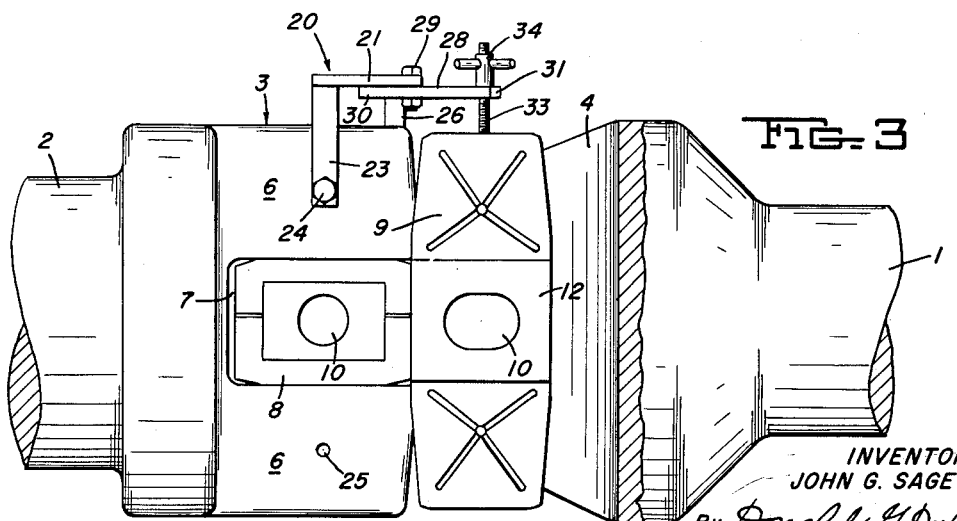
INVENTOR
JOHN G. SAGE
By Donald G. Dalton
Attorney Feb. 13, 1962  J. G. SAGE  3,020,629
APPARATUS FOR CHANGING BEARING SLIPPERS IN ROLLING
MILL UNIVERSAL DRIVE ASSEMBLIES
Filed April 23, 1958  2 Sheets-Sheet 2
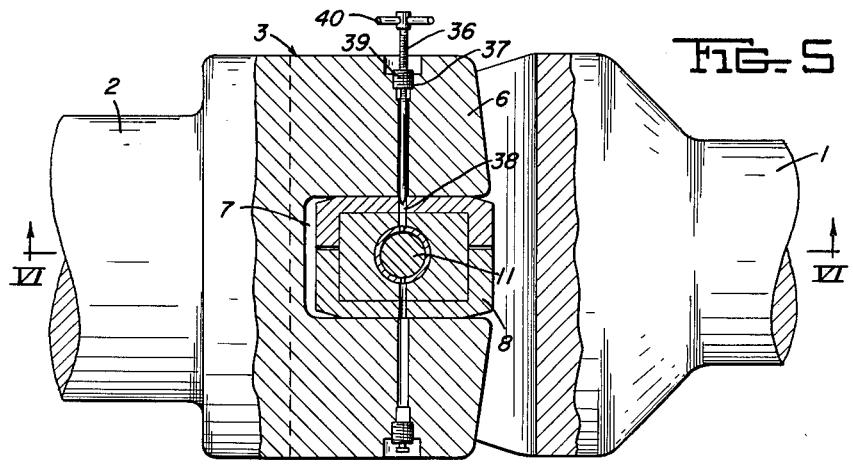
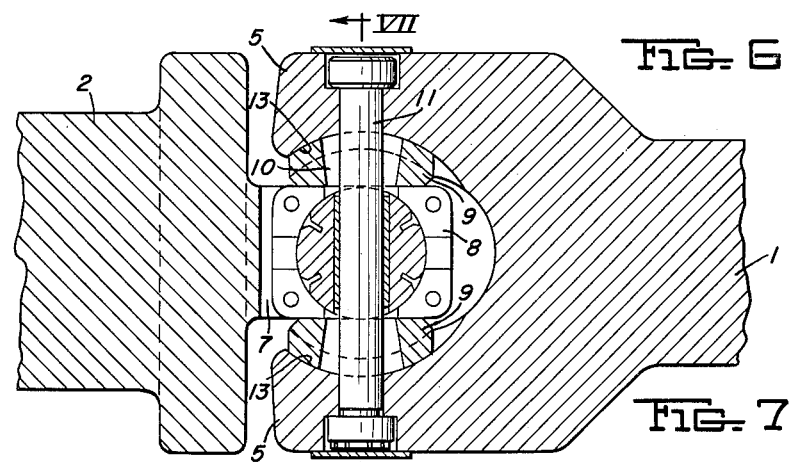
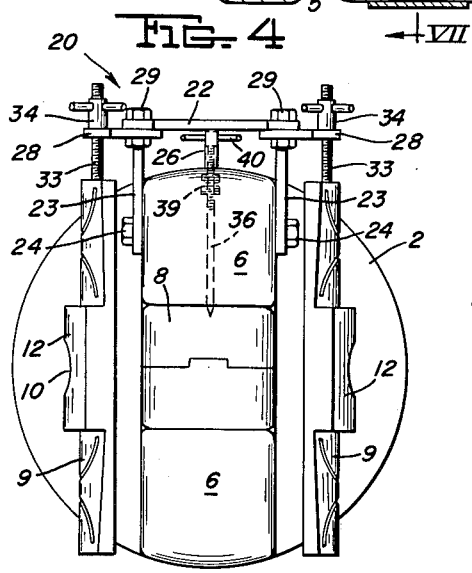
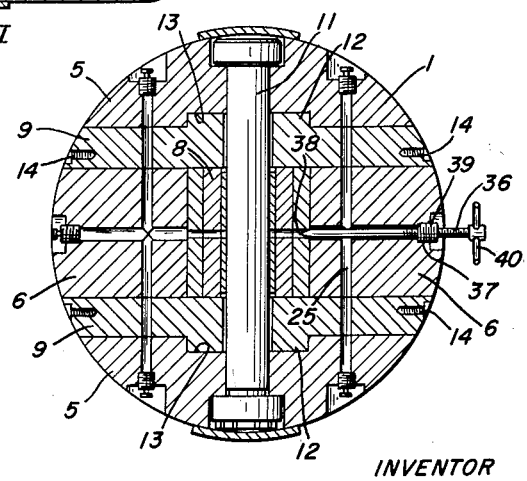
INVENTOR
JOHN G. SAGE
By Donald G. Dalton
Attorney

United States Patent Office 3,020,629
Patented Feb. 13, 1962

3,020,629
APPARATUS FOR CHANGING BEARING SLIPPERS IN ROLLING MILL UNIVERSAL DRIVE ASSEMBLIES
John G. Sage, East McKeesport, Pa., assignor to United States Steel Corporation, a corporation of New Jersey
Filed Apr. 23, 1958, Ser. No. 730,482
8 Claims. (Cl. 29—200)

This invention relates to rolling mill drives and, more particularly, to an apparatus for removing and replacing bearing slippers in a universal drive coupling between a work roll and its drive spindle.

The work rolls in rolling mills of larger sizes, such as blooming and slabbing mills, are usually driven by universal couplings that provide for angular inclination of their drive spindles relative to their respective axes. In coupling arrangements of this character, the required universal movement is provided in part by a pair of brass bearing slippers between the driving and driven parts of the connection. By reason of the heavy bearing pressures to which they are subjected during operation, such bearing slippers usually require replacement at intervals of about three months.

According to conventional practices, the replacement of bearing slippers is essentially a manual operation that is performed with the assistance of a mill crane. The work for this purpose must be performed under hazardous conditions in confined areas where the millwrights performing the operation frequently cannot be seen by the crane operator. Manual work in such areas, moreover, is particularly difficult by reason of poor lighting, and the heat, grease, dirt and generally unsafe working conditions under which it must be performed. In addition, conventional practices commonly require a period of approximately eight hours for changing a single set of bearing slippers and the continuous service of the mill crane during most of this period.

One of the principal objects of this invention is to provide an apparatus for changing bearing slippers in rolling mill universal drive assemblies that will eliminate hazard to the workmen and reduce the time required for performing this operation.

Another object of the invention is to provide a frame for supporting the bearing slippers on a work roll fishtail in such manner that their removal and replacement in a universal drive assembly is effected by axial movement of the fishtail to and from an operative driving position with respect to its drive spindle.

Other objects and advantages of the invention will become apparent from the following description.

In the drawings, there is shown a preferred embodiment of the invention. In this showing:

FIGURE 1 is a top plan view of a universal coupling or assembly for driving a rolling mill work roll that shows a slipper changing apparatus constructed in accordance with the principles of this invention;

FIGURE 2 is a view similar to FIGURE 1 but showing the work roll fishtail in a withdrawn position in which it is clear of the space between a pair of bearing slippers;

FIGURE 3 is a side elevational view of the structure shown in FIGURE 2 in which a portion of the drive spindle is broken away to show one of the bearing slippers and the manner in which it is supported by the apparatus of this invention;

FIGURE 4 is an end view of a work roll fishtail showing a pair of bearing slippers supported thereon by the apparatus of this invention;

FIGURE 5 is a sectional view of an assembled coupling taken substantially in the plane of the line V—V of FIGURE 1;

FIGURE 6 is a sectional view taken in the plane of the line VI—VI of FIGURE 5; and FIGURE 7 is a sectional view taken along the line VII—VII of FIGURE 6.

The drawings show a universal coupling of conventional construction for transmitting power from the bifurcated end of a drive spindle 1 to the roll-neck 2 of a work roll, for example, in a slabbing or blooming mill. It comprises a fishtail 3 which projects axially outwardly from the roll-neck 2 and is received in a space 4 between the spindle bifurcations 5. The fishtail 3 is formed by drive lugs or arms 6 that are spaced equally in opposite radial directions from the center of the roll-neck 2 to provide a space 7 in which torque-transmitting bearing block 8 has a bearing support for swivelling movement. A pair of brass slippers 9 is arranged between the bifurcations 5 and the sides of the fishtail 3 when it occupies the assembled position shown in FIGURES 5–7 of the drawings. In this position, the spindle bifurcations 5, slippers 9 and bearing block 8 have openings 10 which are aligned for the reception of a drive pin 11 that operates to transmit torque from the spindle 1 through the bearing block 8 to the fishtail 3. This arrangement provides for swivelling movement of the slippers 9 over opposite sides of the fishtail arms 6 and bearing block 8 and about the axis of the pin 11. Facing surfaces on the slippers 9 and the spindle bifurcations 5 have a cylindrical contour that provides for pivotal movement of the spindle 1 about an axis normal to the axis of the pin 11. Each slipper 9 has an enlarged portion 12 which is received in a recess 13 in the bifurcation 5 that it faces to hold it against endwise movement in the space 4. The structure of the universal drive assembly between the spindle 1 and roll-neck 2 thus far described is conventional and forms no part per se of this invention.

According to conventional practices, removal and replacement of the spindle slippers 9 is effected by first removing the drive pin 11 and then bolting retaining straps about the spindle 1 to hold the slippers 9 in the space 4, the bolt holes 14 in the ends of the slippers 9 being used for this purpose. Next, the fishtail 3 is moved out of the space 4 by moving the roll-neck 2 to the left as viewed in the drawings, the usual roll changing rig and slide for handling the roll attached to the roll-neck being used for this purpose. After the fishtail 3 is moved out of the space 4, the slipper holding straps are removed so that the slippers 9 can be lifted out of the spindle space 4 by eye bolts (not shown) threaded in the bolt openings 14 and attached to cables suspended from the mill crane. As indicated above, these operations are time consuming since they require separate handling of each slipper 9 and the bearing block 8 by the mill crane, and are performed under hazardous conditions by millwrights working in a confined area.

In accordance with the principles of this invention, removal and replacement of bearing slippers 9 is effected by movement of the roll-neck 2 in an axial direction relative to the spindle 1, and without the necessity of supporting any of the parts by cables from the mill crane. This is accomplished by clamping the bearing block 8 against movement in the fishtail opening 7, and by suspending the bearing blocks 9 on one of the lugs 6 for movement therewith. In this manner the bearing slippers 9 are removed and replaced with respect to their operative positions in the space 4 between the spindle bifurcations 5 by axial movement of the roll-neck 2 in opposite axial directions with respect to the spindle 1.

The suspension for the slippers 9 on the fishtail 3 comprises a rigid welded frame 20 that is formed of horizontal side bars 21 and a cross bar 22. Legs 23 depending vertically from the inner ends of the side bars 21 are secured to opposite faces of the upper fishtail lugs 6 by bolts 24 which have threaded engagement in the outer end of lubricant supply openings 25 (see FIGURE 7), the openings 25 being tapped for the reception of the bolts 24. Pivotal movement of the frame 20 about the bolts 24 is prevented by a lug 26 that depends from the cross bar 22 and engages the upper surface of one of the fishtail arms 6 as best shown in FIGURE 3.

Each of the slippers 9 is supported on one of the side bars 21 by a link 28. The links 28 are connected to the outer ends of the frame side bars 21 by pivot bolts 29 for pivotal movement about parallel vertical axes that are spaced equal distances with respect to the axis of the roll-neck 2. The inner ends 30 of the links 28 have sliding and supporting engagement with the underside of the frame side pieces 21, and their outer ends 31 project outwardly from the ends of the frame sides 21 and have slots 32 in which slipper supporting pins 33 are received. The lower end of each pin 33 has threaded engagement in a slipper bolt hole 14 (see FIGURE 7), and the upper end thereof has threaded engagement in an adjusting collar 34 which is supported for rotational and sliding movement on a supporting link 28. In this manner, each of the slippers 9 is supported by the frame 20 on a fishtail lug 6 for rotational movement about the axis of its supporting pin 33, and for pivotal movement about the axis of a pivot bolt 29. In addition, the slot 32 of its pin and slot support provides for relative axial movement of each of the slippers 9 a limited distance that is determined by the length of the slot 32. The threaded support of the pins 33 in the collars 34 further provides for adjustment of the vertical positions of the slippers 9 which may be made by rotating the collars 34. Handles (not shown) may be applied to the upper ends of the pins 33 to facilitate their being threaded in the bolt holes 14.

To clamp the torque transmitting bearing block 8 against movement in the fishtail opening 7, a pointed clamping pin 36 is inserted through a lubricant supply opening 37 in a fishtail arm 6 to a position in which its inner end engages in a lubricant supply opening 38 in the bearing block 8 as shown in FIGURE 7. To secure the clamping rod 36 in the opening 37, the outer end has threaded engagement in a collar assembly 39 which has threaded engagement in the outer end of the lubricant supply opening 37 that normally receives a lubricating fitting. A handle 40 at its outer end provides for rotation of the clamping rod 36 to adjust the force of its clamping engagement in the bearing block opening 38.

In operation, the apparatus of this invention is applied to a universal drive assembly for the purpose of changing bearing slippers 9 by first applying a clamping rod 36 to secure the bearing block 8 against movement with respect to the fishtail arms 6. The coupling is then rotated to a position in which its drive pin 11 extends vertically so that it may be withdrawn from the aligned openings 10 by the mill crane. The coupling is then rotated through an angle of 90° to place the slippers 9 in vertical positions, and the roll changing rig and slide (not shown) is then operated to move the roll-neck 2 and fishtail 3 axially to the partially withdrawn position shown in FIGURE 1 of the drawings, in order that the supporting frame 20 can be bolted to the upper fishtail lug 6 and the suspending pins 33 may be attached to the slippers 9 as described above. When these operations are completed, the apparatus is in condition for removal of the slippers 9 by continuing the outward axial movement of the fishtail 3.

As the fishtail 3 moves from the position shown in FIGURE 1 to the position shown in FIGURE 2, the only action that takes place is the movement of the suspending pins 33 from the inner ends to the outer ends of the slots 32 in the pivot links 31. As the fishtail 3 moves to the position shown in FIGURE 2, its outer end is cleared of the space 4 between the slippers 9 which are thus freed for pivotal movement about the axis of the pins 33, and about the axis of the pivot bolts 29. Further continued movement of the fishtail 3 to the left from the position shown in FIGURE 2 causes the slippers 9 to move axially outwardly with the supporting frame 20 since their suspending pins 33 are, at this time, at the inner ends of the slots 32 and will not permit further relative movement with respect to the supporting links 28. As the slippers 9 move outwardly in response to continued movement of the roll-neck 2 to the left as viewed in FIGURES 2 and 3, a camming action is produced by the curved surface on the inner faces of the spindle bifurcations 5 which rotates the slippers 9 about the axes of the pins 33 and pivot bolts 29. Such camming action causes the slipper plates 9 to pivot in opposite rotational directions toward each other to positions in which they can move outwardly through the space between adjacent edges of the bifurcations 5. After removal from the opening 4 in this manner, the slippers 9 can be readily removed from the mill by the mill crane after they are detached from the suspending pins 33.

Replacement of bearing slippers 9 in the bifurcations 5 is made by performing the operations described above in reverse order.

Compared to conventional practices that require periods of eight hours and longer to change bearing slippers, the apparatus of this invention enables change of bearing slippers in less than one hour. In addition to reducing the time required for this purpose, the mill crane is released for other work in the mill where its use may be needed.

While one embodiment of my invention has been shown and described it will be apparent that other adaptations and modifications may be made without departing from the scope of the following claims.

I claim:

1. In an apparatus for removing and replacing a pair of bearing slippers in a rolling mill universal drive assembly that includes a bifurcated drive spindle and a roll-drive fishtail between the bifurcations of said spindle, and in which said slippers normally occupy positions respectively on opposite sides of said fishtail, the combination with said slippers and fishtail, of a supporting frame mounted on said fishtail, and means for suspending said slippers from said frame for movement toward each other to positions in which they can be moved to and from the space between said spindle bifurcations by axial movement of said fishtail relative to said spindle, said suspending means comprising a pair of brackets from which said slippers are respectively suspended, and a pair of pivots on said frame at points equally spaced relative to the axis of said fishtail mounting said brackets for movement about parallel axes.

2. An apparatus as defined in claim 1 characterized by each of said brackets extending axially outwardly with respect to the outer end of said fishtail and having a slot extending lengthwise thereof, and each of said slippers having a pin projecting from a central point at one end thereof through one of said slots and mounting it for pivotal and lengthwise movement therein.

3. In an apparatus for removing and replacing a pair of bearing slippers in a rolling mill universal drive assembly including a spindle having a bifurcated end and a roll drive fishtail mounted respectively for axial movement relative to each other to and from an operative driving position in which said fishtail is arranged between the spindle bifurcations and said slippers occupy positions respectively on opposite sides of said fishtail, the combination therewith of a supporting frame for detachable connection to said fishtail, and means mounting said slippers on said frame for limited axial movement relative thereto to provide for movement of said fishtail between said operative position and an intermediate position in which it is clear of the space between said bifurcations and said slippers, said mounting means further including means providing for movement of said slippers toward each other to positions in which they can be moved to and from the space between said spindle bifurcations by axial movement of said fishtail over a path arranged outwardly of said intermediate position.

4. In an apparatus for removing and replacing a pair of bearing slippers in a rolling mill universal drive assembly including a spindle having a bifurcated end, a roll drive fishtail, and a torque transmitting bearing block arranged centrally of said fishtail and adapted to have a swivelling movement relative thereto, said spindle and fishtail being movable axially relatively to each other to and from an operative driving position in which said fishtail is arranged between the spindle bifurcations and said slippers occupy positions respectively on opposite sides of said fishtail, the combination therewith of means for clamping said bearing block against movement relative to said fishtail, a supporting frame for detachable connection to said fishtail, and means mounting said slippers on said frame for limited axial movement relative thereto to provide for movement of said fishtail between said operative position and an intermediate position in which it is clear of the space between said bifurcations and said slippers, said mounting means further including means providing for movement of said slippers toward each other to positions in which they can be moved to and from the space between said spindle bifurcations by axial movement of said fishtail over a path arranged outwardly of said intermediate position.

5. An apparatus as defined in claim 4 characterized by said fishtail and bearing block having aligned openings for the supply of lubricant to bearing surfaces on said block, and said clamping means comprising a rod extending through said openings and having a threaded connection in said fishtail.

6. In apparatus for removing and replacing bearing slippers in a rolling mill universal drive assembly of the character described, the combination comprising a fishtail having a pair of radially spaced and axially projecting arms, a torque transmitting bearing block supported for swivelling movement between said arms, said block and one of said arms having aligned openings for the supply of lubricant to bearing surfaces on said block, and a clamping rod extending through said openings and having a threaded connection in said one arm holding it against movement therein.

7. In an apparatus for removing and replacing a pair of bearing slippers in a rolling mill universal drive assembly, the combination comprising a bifurcated drive spindle, a roll drive fishtail between the bifurcations of said spindle, said fishtail having a pair of radially spaced and axially projecting arms, a torque transmitting bearing block supported for swivelling movement between said arms, said block and one of said arms having aligned openings for the supply of lubricant to bearing surfaces on said block, a clamping rod extending through said openings and having a threaded connection in said one arm holding it against movement therein, a pair of bearing slippers respectively on opposite sides of said fishtail, a supporting frame mounted on said fishtail, and means for suspending said slippers from said frame for movement toward each other to positions in which they can be moved to and from the space between said spindle bifurcations by axial movement of said fishtail relative to said spindle.

8. In an apparatus for removing and replacing a pair of bearing slippers in a rolling mill universal drive assembly that includes a spindle having a bifurcated end and a roll drive fishtail mounted respectively for axial movement relative to each other to and from an operative driving position in which said fishtail is arranged between the spindle bifurcations and said slippers occupy positions respectively on opposite sides of said fishtail, the combination therewith of a supporting frame detachably mounted on said fishtail, and means for suspending said slippers from said frame comprising a pair of brackets respectively having pivotal supports on said frame for movement about parallel axes spaced laterally equal distances relative to the axis of said fishtail, each of said brackets extending axially outwardly with respect to the outer end of said fishtail and having a longitudinally extending slot in its outer end, each of said slippers having a pin projecting from one end thereof and through one of said bracket slots, and means supporting said pins on said brackets for pivotal and lengthwise movement in said slots, said slipper suspending means providing for movement of said slippers in response to axial movement of said fishtail relative to said spindle to positions in which they can be moved through the space between the bifurcations of said spindle end.

References Cited in the file of this patent

UNITED STATES PATENTS

| | | |
|---|---|---|
| 1,048,821 | Gill | Dec. 31, 1912 |
| 2,084,439 | Hamer | June 22, 1937 |
| 2,306,461 | Miller | Dec. 29, 1942 |
| 2,353,650 | Colley | July 18, 1944 |
| 2,566,637 | Roberts | Sept. 4, 1951 |
| 2,571,265 | Leufven | Oct. 16, 1951 |
| 2,618,941 | Iversen | Nov. 25, 1952 |
| 2,769,323 | O'Malley | Nov. 6, 1956 |